(12) United States Patent
Kiyota

(10) Patent No.: US 12,717,586 B2
(45) Date of Patent: Aug. 25, 2026

(54) REPLACEMENT DEVICE, INFORMATION PROCESSING METHOD, AND INFORMATION PROCESSING DEVICE

(71) Applicant: SONY GROUP CORPORATION, Tokyo (JP)

(72) Inventor: Koji Kiyota, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 113 days.

(21) Appl. No.: 18/721,710

(22) PCT Filed: Dec. 15, 2022

(86) PCT No.: PCT/JP2022/046150
§ 371 (c)(1),
(2) Date: Jun. 19, 2024

(87) PCT Pub. No.: WO2023/127516
PCT Pub. Date: Jul. 6, 2023

(65) Prior Publication Data

US 2025/0085976 A1 Mar. 13, 2025

(30) Foreign Application Priority Data

Dec. 27, 2021 (JP) ................................ 2021-212953

(51) Int. Cl.
*G06F 15/177* (2006.01)
*G06F 9/4401* (2018.01)
(Continued)

(52) U.S. Cl.
CPC .......... *G06F 9/4406* (2013.01); *G06F 9/4486* (2018.02); *G06F 12/0246* (2013.01); *G06F 9/4401* (2013.01)

(58) Field of Classification Search
CPC .. G06F 9/4406; G06F 9/4486; G06F 12/0246; G06F 9/4401; G06F 12/00; G06F 12/06
(Continued)

(56) References Cited

U.S. PATENT DOCUMENTS 5,848,367 A * 12/1998 Lotocky .............. G06F 11/1417 709/212
8,117,431 B2 * 2/2012 Wang ...................... G06F 21/57 726/16
(Continued)

FOREIGN PATENT DOCUMENTS

JP 2002-297561 A 10/2002
JP 2003-196115 A 7/2003
(Continued)

OTHER PUBLICATIONS

International Search Report and Written Opinion of PCT Application No. PCT/JP2022/046150, issued on Feb. 7, 2023, 08 pages of ISRWO.

*Primary Examiner* — Volvick Derose
(74) *Attorney, Agent, or Firm* — CHIP LAW GROUP

(57) ABSTRACT

A replacement device according to an embodiment includes: a first determination unit that determines whether or not a processor has performed access of instruction fetch to a predetermined address of a nonvolatile memory on the nonvolatile memory used by the processor as a boot device; a second determination unit that determines whether or not data acquired by the access of the instruction fetch from the nonvolatile memory matches identification information indicating that program data has been written in the nonvolatile memory when the first determination unit determines that the access of the instruction fetch to the predetermined address has been performed; and a replacement unit that replaces the data with one of a first instruction to change a program counter in the processor and a second instruction
(Continued)

not to change the program counter in accordance with a determination result from the second determination unit, and outputs one of the first instruction and the second instruction to the processor.

20 Claims, 8 Drawing Sheets

(51) Int. Cl.
*G06F 9/448* (2018.01)
*G06F 12/02* (2006.01)

(58) Field of Classification Search
USPC .............................................................. 713/2
See application file for complete search history.

(56) References Cited

U.S. PATENT DOCUMENTS

2008/0016296 A1* 1/2008 Murayama .......... G06F 13/4234 711/E12.001
2009/0083521 A1* 3/2009 Sato ........................ G06F 21/14 712/E9.016
2010/0185804 A1* 7/2010 Omizo ................ G06F 12/0246 711/E12.001
2012/0246384 A1* 9/2012 Lin ..................... G06F 12/0246 711/E12.008
2012/0331560 A1* 12/2012 Chowdhury ........ G06F 12/1441 726/26
2013/0013904 A1* 1/2013 Tran ...................... G06F 1/1632 455/557
2013/0198437 A1* 8/2013 Omizo ................ G06F 12/0246 711/103
2014/0281458 A1* 9/2014 Ravimohan ........... G06F 9/4401 713/2
2015/0058535 A1* 2/2015 Lasser ................ G11C 16/3495 711/103
2015/0318049 A1* 11/2015 Behl ...................... G11C 16/32 711/103
2019/0050602 A1* 2/2019 Sela ......................... G11C 7/24
2023/0102540 A1* 3/2023 Landge ................. G06F 3/0622 711/163
2025/0085976 A1* 3/2025 Kiyota .................... G06F 12/00

FOREIGN PATENT DOCUMENTS

JP 2005-242510 A 9/2005
JP 2008-165729 A 7/2008
JP 2019-087171 A 6/2019

* cited by examiner

FIG.5

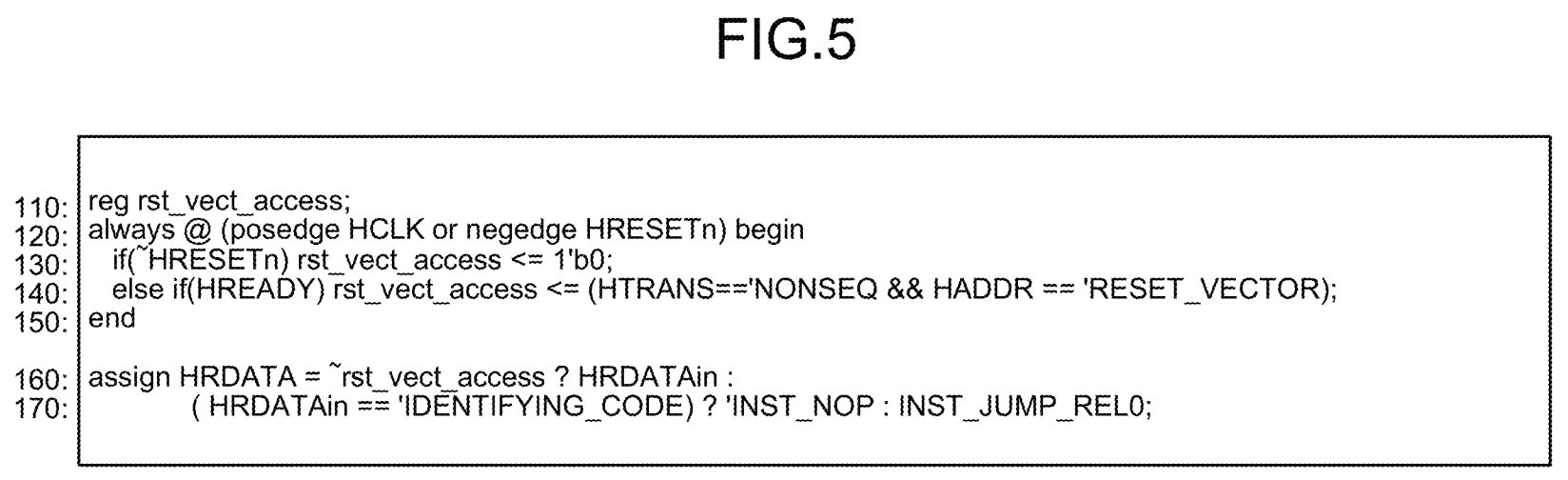

```
reg rst_vect_access;
always @ (posedge HCLK or negedge HRESETn) begin
   if(~HRESETn) rst_vect_access <= 1'b0;
   else if(HREADY) rst_vect_access <= (HTRANS=='NONSEQ && HADDR == 'RESET_VECTOR);
end

assign HRDATA = ~rst_vect_access ? HRDATAin :
            ( HRDATAin == 'IDENTIFYING_CODE) ? 'INST_NOP : INST_JUMP_REL0;
```

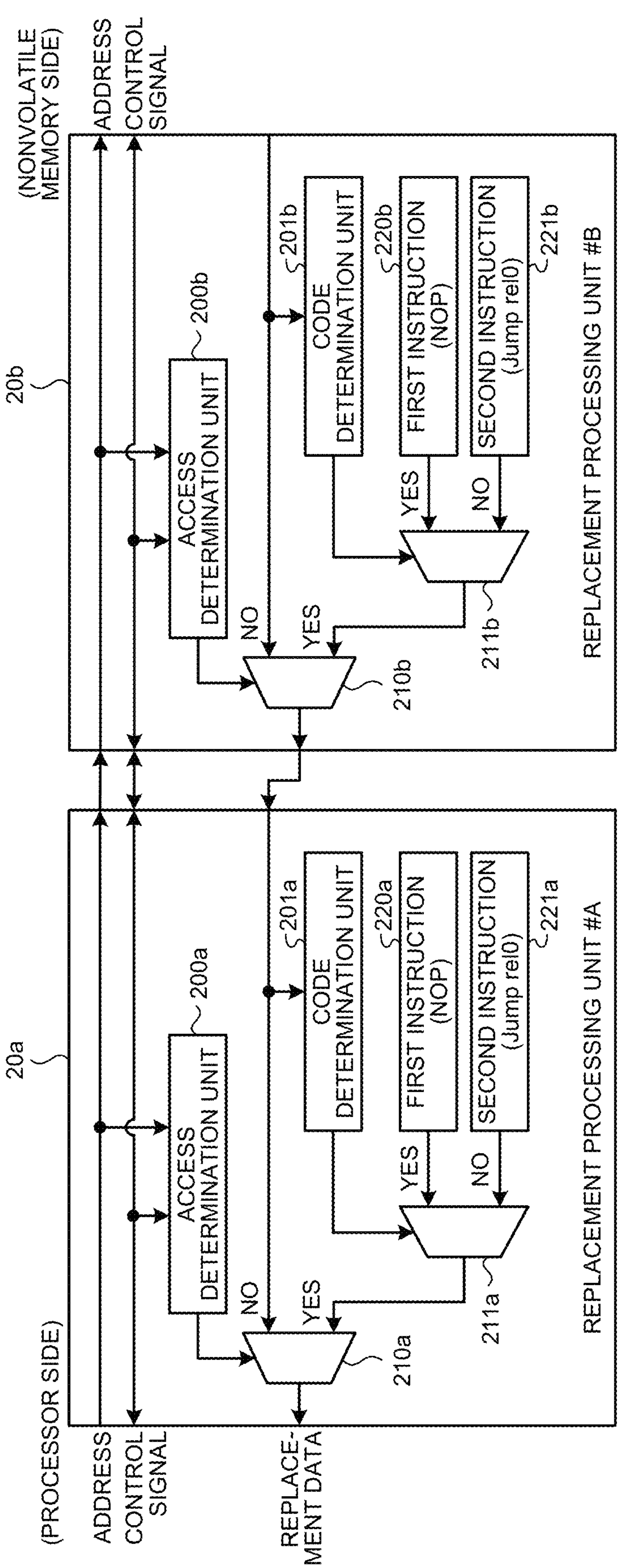
FIG.12
(NONVOLATILE MEMORY SIDE)
ADDRESS
CONTROL SIGNAL
20b
200b
ACCESS DETERMINATION UNIT
201b
CODE DETERMINATION UNIT
220b
FIRST INSTRUCTION (NOP)
221b
SECOND INSTRUCTION (Jump rel0)
YES
NO
211b
210b
REPLACEMENT PROCESSING UNIT #B
20a
200a
ACCESS DETERMINATION UNIT
201a
CODE DETERMINATION UNIT
220a
FIRST INSTRUCTION (NOP)
221a
SECOND INSTRUCTION (Jump rel0)
211a
210a
REPLACEMENT PROCESSING UNIT #A
(PROCESSOR SIDE)
REPLACE-MENT DATA

REPLACEMENT DEVICE, INFORMATION PROCESSING METHOD, AND INFORMATION PROCESSING DEVICE

CROSS REFERENCE TO RELATED APPLICATIONS

This application is a U.S. National Phase of International Patent Application No. PCT/JP2022/046150 filed on Dec. 15, 2022, which claims priority benefit of Japanese Patent Application No. JP 2021-212953 filed in the Japan Patent Office on Dec. 27, 2021. Each of the above-referenced applications is hereby incorporated herein by reference in its entirety.

FIELD

The present disclosure relates to a replacement device, an information processing method, and an information processing device.

BACKGROUND

In a system using a nonvolatile memory as a storage device, contents of the nonvolatile memory are written after the device is mounted on a circuit board.

For example, a NAND flash memory as one example of the nonvolatile memory has a characteristic of storage contents being lost at high temperatures. In the characteristic, the storage contents of the NAND flash memory are lost by heat in a soldering process at the time when the NAND flash memory is mounted on a printed circuit board, so that the contents are required to be written after the NAND flash memory is mounted on the circuit board. Therefore, in a system in which a NAND flash memory is mounted, it is common to prepare a special operation mode (writing mode) for executing writing to the nonvolatile memory after the memory is mounted on a circuit board.

For example, Patent Literature 1 discloses a method using an external terminal and a method using a boot mode as a method of performing transition to a writing mode for performing writing to a nonvolatile memory after being mounted on a circuit board. Furthermore, Patent Literature 1 discloses that a nonvolatile memory stores a program for performing these methods.

CITATION LIST

Patent Literature

Patent Literature 1: JP 2003-196115 A

SUMMARY

Technical Problem

In a nonvolatile memory whose storage contents are lost at high temperatures, as described above, the storage contents are lost due to heat in a soldering process at the time when the nonvolatile memory is mounted on a circuit board. Therefore, it is not preferable to apply such a nonvolatile memory as a memory in which a program for performing transition to the writing mode in Patent Literature 1 is preliminarily written.

In contrast, it is conceivable that a read only memory (ROM) is mounted in the system and the program for performing transition to the writing mode is preliminarily written in the ROM. Furthermore, it is also conceivable that a hardware sequencer is mounted on the system and writing is performed to the nonvolatile memory without depending on the program. In these methods, however, a configuration is added to the system, which may increase costs.

Furthermore, it is also conceivable to allocate an external terminal in order to perform writing to the nonvolatile memory. In this case, however, costs may be increased from the viewpoint of a package size, a circuit board mounting area, and the like.

The present disclosure provides a replacement device, an information processing method, and an information processing device capable of achieving transition to a first writing mode for performing first writing to a nonvolatile memory after being mounted on a circuit board at lower costs.

For solving the problem described above, a replacement device according to one aspect of the present disclosure has a first determination unit that determines whether or not a processor has performed access of instruction fetch to a predetermined address of a nonvolatile memory on the nonvolatile memory used by the processor as a boot device; a second determination unit that determines whether or not data acquired by the access of the instruction fetch from the nonvolatile memory matches identification information indicating that program data has been written in the nonvolatile memory when the first determination unit determines that the access of the instruction fetch to the predetermined address has been performed; and a replacement unit that replaces the data with one of a first instruction to change a program counter in the processor and a second instruction not to change the program counter in accordance with a determination result from the second determination unit, and outputs one of the first instruction and the second instruction to the processor.

BRIEF DESCRIPTION OF DRAWINGS

FIG. 5 is a schematic diagram illustrating a description example in Verilog-HDL at the time when the replacement processing unit according to the embodiment is implemented on an AHB bus.

FIG. 12 is a block diagram illustrating a configuration of one example of the replacement processing units according to the fourth variation of the embodiment.

DESCRIPTION OF EMBODIMENTS

Figure 1:
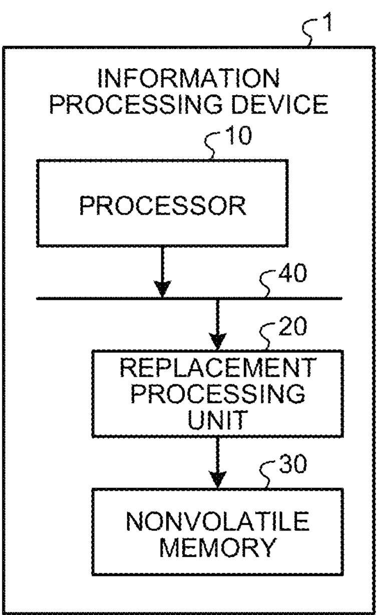
FIG. 1 is a block diagram schematically illustrating a configuration of one example of an information processing device including a replacement device according to the present disclosure.

An embodiment of the present disclosure will be described in detail below with reference to the drawings. Note that, in the following embodiment, the same signs are attached to the same parts, and thereby duplicate descriptions thereof are omitted.

The embodiment of the present disclosure will be described below in the following order.

1. Background of Present Disclosure
2. Embodiment
2-1. Configuration Applicable to Embodiment
2-2. Writing Processing According to Embodiment
3. Variations of Embodiment
3-1. First Variation of Embodiment
3-2. Second Variation of Embodiment
3-3. Third Variation of Embodiment
3-4. Fourth Variation of Embodiment

1. BACKGROUND OF PRESENT DISCLOSURE

Prior to describing the embodiment of the present disclosure, background of the present disclosure will be described for easy understanding.

Conventionally, in a system in which a processor uses a nonvolatile memory as a boot device, after the device is mounted on a circuit board, data, for example, program data of a start-up program for starting the processor has been written to the nonvolatile memory. Known examples of the nonvolatile memory used for such an application include a NAND flash memory and a NOR flash memory.

While the NAND flash memory has a low bit unit price and a large capacity, the storage contents thereof are lost at high temperatures. In such a nonvolatile memory whose storage contents are lost at high temperatures, the storage contents are lost by heat generated in a soldering process at the time when the nonvolatile memory is mounted on a printed circuit board and the like. Therefore, for example, data is required to be written after the nonvolatile memory is mounted on a circuit board.

In contrast, although the storage contents of the NOR flash memory are not lost at high temperatures, the NOR flash memory has a higher bit unit price and a smaller capacity than the NAND flash memory. Such a nonvolatile memory whose storage contents are not lost at high temperatures can be mounted on a circuit board and the like after data is written. There is, however, a case where data is desired to be written after the nonvolatile memory is mounted on a circuit board depending on an application of a system.

For these reasons, a special mode for performing so-called on-board writing has been prepared. In the on-board writing, program data of a start-up program is written to the nonvolatile memory after the nonvolatile memory is mounted on a circuit board.

For example, Patent Literature 1 discloses a method using an external terminal and a method using a boot mode as a method of performing transition to a writing mode for performing writing to a nonvolatile memory after being mounted on a circuit board. Furthermore, Patent Literature 1 discloses that a nonvolatile memory stores a program for performing these methods.

Depending on the cost required for a system and the requirement of the capacity of a storage device, it is desired to use a nonvolatile memory such as a NAND flash memory as an only nonvolatile memory of the system. While the storage contents of the nonvolatile memory such as a NAND flash memory are lost at high temperatures, the nonvolatile memory has a low bit unit price and a large capacity.

In a nonvolatile memory whose storage contents are lost at high temperatures such as the NAND flash memory, as described above, the storage contents are lost by heat in a soldering process at the time when the nonvolatile memory is mounted on a circuit board. Therefore, it is not preferable to apply such a nonvolatile memory as a memory in which a program for performing transition to the writing mode in, for example, Patent Literature 1 is preliminarily written.

In contrast, it is conceivable that a read only memory (ROM) is mounted in the system and the program for performing transition to the writing mode is preliminarily written in the ROM. Furthermore, it is also conceivable that a hardware sequencer is mounted on the system and writing is performed to the nonvolatile memory without depending on the program. In these methods, however, a configuration is added to the system, which may increase costs. Furthermore, it is also conceivable to allocate an external terminal in order to perform writing to the nonvolatile memory. In this case, however, costs may be increased from the viewpoint of a package size, a circuit board mounting area, and the like.

Moreover, once a program for performing transition to the writing mode can be written in the nonvolatile memory, any operation including the transition to the writing mode can be performed by the written program thereafter. Therefore, resources requiring the costs as described above are required only once at the first time when the on-board writing is first performed on a nonvolatile memory in which nothing is written. Thus, it is desirable that the program for performing transition to a mode of writing to the nonvolatile memory can be written at lower costs.

2. EMBODIMENT

The embodiment of the present disclosure will be described.

When access to a nonvolatile memory of a processor is access to a predetermined address at which the processor first performs instruction fetch after reset release, a replacement device according to the present disclosure determines whether or not a value fetched from the address corresponds to preset identification information. When determining that the fetched value corresponds to the identification information, the replacement device replaces the value fetched from the nonvolatile memory with an instruction to change a program counter in the processor, and passes the instruction to the processor. In contrast, when determining that the fetched value does not correspond to the identification information, the replacement device replaces the value fetched from the nonvolatile memory with an instruction not to change the program counter, and passes the instruction to the processor.

Processing of reading the identification information from the nonvolatile memory can be executed by an instruction fetch operation performed by the processor by applying the replacement device according to the present disclosure configured as described above. This eliminates the need to have a separate configuration for reading the identification information. Furthermore, only when the nonvolatile memory stores the identification information, a program based on program data stored in the nonvolatile memory can be executed and booted.

2-1. Configuration Applicable to Embodiment

A configuration applicable to the embodiment will be described. FIG. 1 is a block diagram schematically illustrating a configuration of one example of an information processing device including a replacement device according to the present disclosure. Note that, in FIG. 1, portions deeply associated with the embodiment in the information processing device are extracted and illustrated, and portions slightly associated with the embodiment are appropriately omitted.

In FIG. 1, an information processing device 1 includes a processor 10, a replacement processing unit 20, and a nonvolatile memory 30. The processor 10 is connected to the replacement processing unit 20 via a bus 40, and can access the nonvolatile memory 30 via the replacement processing unit 20. For example, a NAND flash memory or a NOR flash memory can be applied as the nonvolatile memory 30.

In FIG. 1, a direction of an arrow connecting the units (processor 10, replacement processing unit 20, nonvolatile memory 30, and bus 40) indicates a relation of an initiator and a target in access.

The units (processor 10, replacement processing unit 20, nonvolatile memory 30, and bus 40) of the information processing device 1 are mounted, for example, on one circuit board or in one package. This is not a particular limitation.

Furthermore, the application of the information processing device 1 is not particularly limited. The information processing device 1 is applicable to a system of communication, control, sensing, and the like in Internet of Things (IoT).

Figure 2:
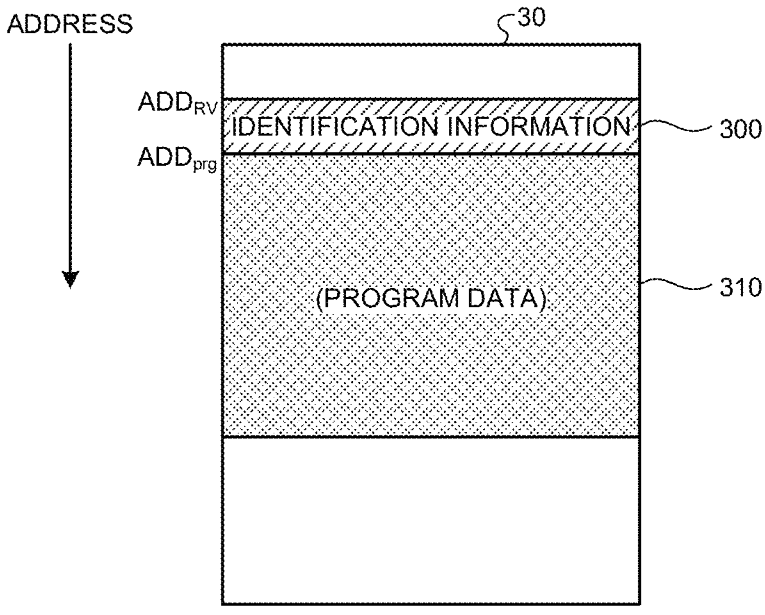
FIG. 2 is a schematic diagram illustrating a configuration of one example of a nonvolatile memory applicable to an embodiment.

FIG. 2 is a schematic diagram illustrating a configuration of one example of the nonvolatile memory 30 applicable to the embodiment. Note that FIG. 2 illustrates an example of a state in which each piece of data is written in the nonvolatile memory 30.

In the nonvolatile memory 30 in which data has been written, identification information 300 is placed at a predetermined address $ADD_{RV}$. Program data 310 of a program executed by the processor 10 at the time of boot is stored at an address $ADD_{prg}$ different from the address $ADD_{RV}$.

The identification information 300 placed at the address $ADD_{RV}$ is a special word for identifying whether or not writing has been performed in the nonvolatile memory 30. For example, when there is a value that the nonvolatile memory 30 can easily take as an initial value, values other than the value are set as the identification information 300. When the initial value of the nonvolatile memory 30 is randomly determined, it is conceivable to use randomly determined values as the identification information 300. Furthermore, the identification information 300 preferably has the number of bits (e.g., 16 bits and 32 bits) in accordance with the bus width of the bus 40, for example.

The address ADDRV is an address at which the processor 10 booted from the nonvolatile memory 30 first performs instruction fetch after reset release, and is also referred to as a reset vector. Hereinafter, the address ADDRV is appropriately referred to as a reset vector.

The address ADDprg at which the program data 310 is placed is determined by the contents of a first instruction to change a program counter of the processor 10 to be described later. For example, when the first instruction is a no operation (NOP) instruction or an instruction to jump to an address immediately after the reset vector, the program data 310 can be placed at the address immediately after the reset vector. When the first instruction is an instruction to jump to a specific address, the program data 310 can be placed at the address of a jump destination of the jump instruction.

Figure 3:
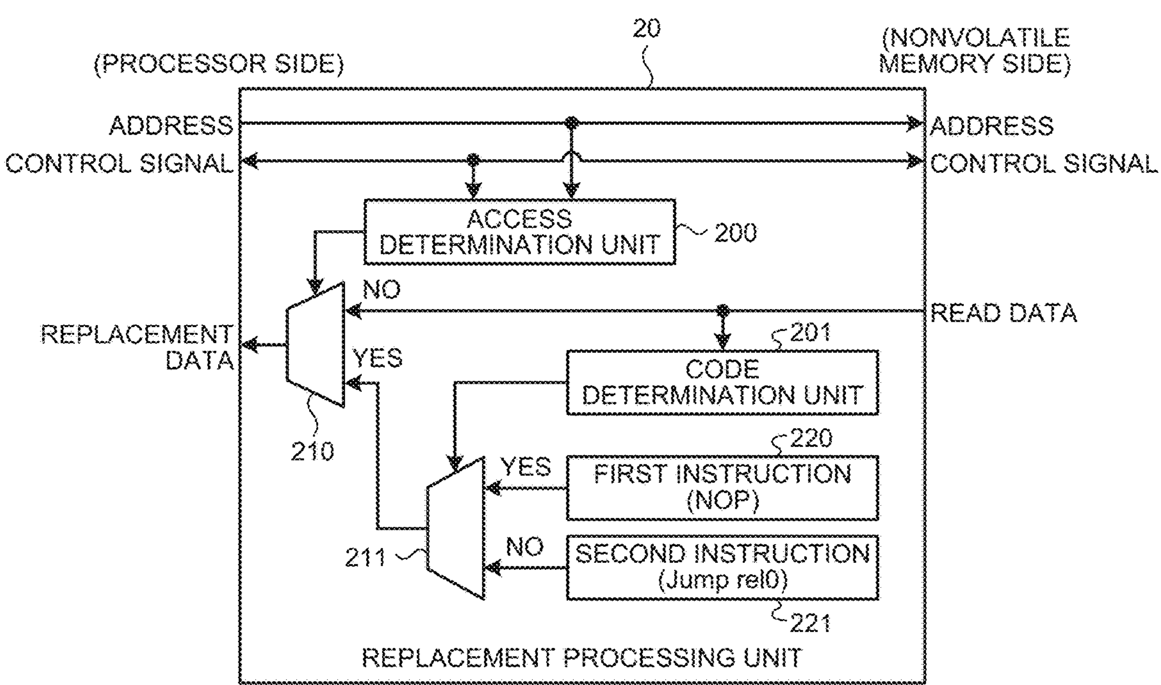
FIG. 3 is a block diagram illustrating a configuration of one example of a replacement processing unit according to the embodiment.

FIG. 3 is a block diagram illustrating a configuration of one example of the replacement processing unit 20 according to the embodiment. In FIG. 3, the replacement processing unit 20 includes an access determination unit 200, a code determination unit 201, a first selector 210, and a second selector 211. Note that, in FIG. 3, the right side in the figure corresponds to a side of the nonvolatile memory 30, and the left side in the figure corresponds to a side of the processor 10.

The access determination unit 200 acquires address information issued to the nonvolatile memory 30 at the time when the processor 10 accesses the nonvolatile memory 30. Furthermore, the access determination unit 200 acquires various pieces of information such as instructions and statuses transmitted and received between the processor 10 and the nonvolatile memory 30 as control signals. The access determination unit 200 controls the first selector 210 based on the acquired address information and various pieces of information.

As described above, the access determination unit 200 to function as a first determination unit that determines whether or not access of instruction fetch to a predetermined address of the nonvolatile memory 30 has been performed for the nonvolatile memory 30 used as a boot device.

Data (read data) read from the nonvolatile memory 30 by the processor 10 is input to the code determination unit 201 and one input port of the first selector 210. The code determination unit 201 determines whether or not the input read data matches the predetermined identification information 300. The code determination unit 201 controls the second selector 211 in accordance with the determination result.

As described above, when the first determination unit (access determination unit 200) determines that the access of instruction fetch to a predetermined address has been performed, the code determination unit 201 functions as a second determination unit that determines whether or not the data acquired from the nonvolatile memory 30 by the access of instruction fetch matches the identification information 300 indicating that the program data 310 has been written in the nonvolatile memory 30.

In the second selector 211, a first instruction 220 is input to a first input port, and a second instruction 221 is input to a second input port. The second selector 211 selects one of the first input port and the second input port in accordance with the determination result from the code determination unit 201, and inputs the selected first instruction or second instruction to the second input port of the first selector 210.

The first instruction 220 is an instruction to change the program counter of the processor 10. For example, the first instruction 220 increments the program counter of the processor 10. A no operation (NOP) instruction to execute only an operation of incrementing the program counter with no operation can be applied as the first instruction 220. This is not a limitation. An instruction to jump to an address different from the reset vector in the nonvolatile memory 30 may be applied as the first instruction 220. In response to the jump instruction, the processor 10 executes a jump to an address different from the reset vector, and changes (e.g., increments) the program counter.

The second instruction is an instruction not to change the program counter of the processor 10. More specifically, an instruction to jump to the same address as the current one of the nonvolatile memory 30, that is, the reset vector can be applied as the second instruction 221. In response to the jump instruction, the processor 10 executes a jump to the same address as the current one. At this time, the processor 10 does not change the program counter.

Under the control of the access determination unit 200, the first selector 210 selects one of the first input port and the second input port, and outputs one of the read data and the first instruction 220 or the second instruction 221 selected by the second selector 211 from the replacement processing unit 20 as replacement data. That is, the first selector 210 outputs the read data read from the nonvolatile memory 30 as replacement data as it is or by replacing the read data with the first instruction 220 or the second instruction 221.

As described above, the first selector 210 functions as a replacement unit that replaces the read data with one of the first instruction 220 to change the program counter in the processor 10 and the second instruction 221 not to change the program counter and that outputs one of the first instruction 220 and the second instruction 221 to the processor 10 in accordance with a determination result from the second determination unit (code determination unit 201).

Figure 4:
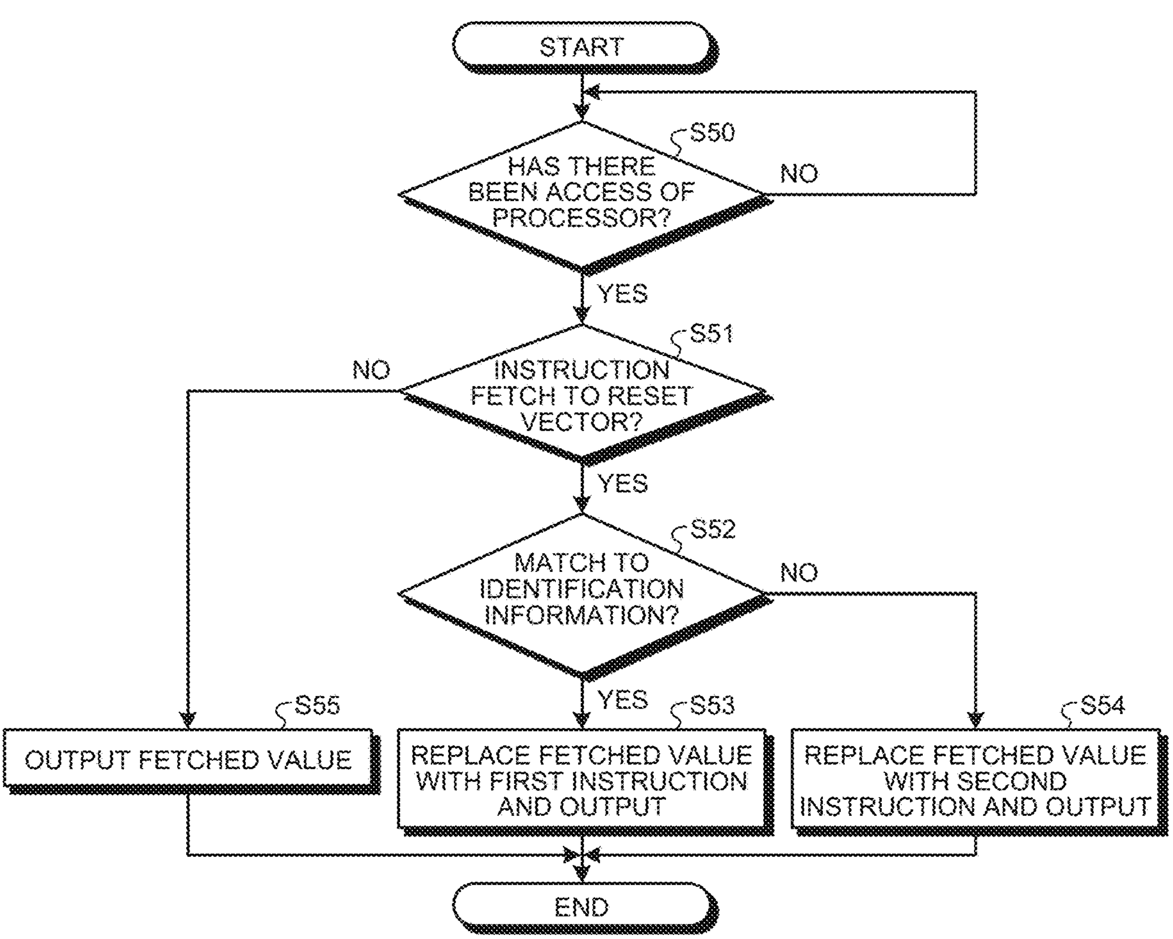
FIG. 4 is a flowchart of one example illustrating processing in the replacement processing unit according to the embodiment.

FIG. 4 is a flowchart of one example illustrating processing in the replacement processing unit 20 according to the embodiment.

The processing according to the flowchart of FIG. 4 is started by, for example, start-up of the information processing device 1 in which the replacement processing unit 20 is incorporated or reset release of the processor 10. Furthermore, although FIG. 4 illustrates a series of processing as ending in processing of Step S53, S54, or S55, the series of processing in the flowchart of FIG. 4 is actually loop processing repeatedly executed by the replacement processing unit 20. That is, when the replacement processing unit 20 is incorporated and operates in the information processing device 1, and the processing of Step S53, S54, or S55 ends, the processing returns to Step S50, and the processing from Step S50 is executed again.

In FIG. 4, in Step S50, the replacement processing unit 20 causes the access determination unit 200 to determine whether or not there has been access of the processor 10 to the nonvolatile memory 30. When the access determination unit 200 determines that there has not been access (Step S50, "No"), the replacement processing unit 20 returns the processing to Step S50.

In contrast, when the access determination unit 200 determines that there has been access of the processor 10 to the nonvolatile memory 30 (Step S50, "Yes"), the replacement processing unit 20 shifts the processing to Step S51.

In Step S51, the replacement processing unit 20 causes the access determination unit 200 to determine whether or not access of the processor 10 to the nonvolatile memory 30 is instruction fetch to the reset vector. For example, in the replacement processing unit 20, the access determination unit 200 may acquire address information indicating an access destination issued by the processor 10 and information indicating the type of the access as a control signal, and determine whether or not the access is instruction fetch to the reset vector based on these pieces of acquired information.

When the access is determined as instruction fetch to the reset vector in Step S51 (Step S51, "Yes"), the replacement processing unit 20 selects the second input port in the first selector 210 under the control of the access determination unit 200, and shifts the processing to Step S52. Furthermore, a value is read from the reset vector of the nonvolatile memory 30 in accordance with the access. The read value is input to the code determination unit 201 and the first input port of the first selector 210 as read data.

In Step S52, the replacement processing unit 20 causes the code determination unit 201 to determine whether or not the value of the read data matches the identification information 300. When determining matching (Step S52, "Yes"), the replacement processing unit 20 shifts the processing to Step S53.

In Step S53, the replacement processing unit 20 selects the first input port of the second selector 211 under the control in accordance with the determination result from the code determination unit 201, outputs the first instruction 220 from the second selector 211, and inputs the first instruction 220 to the second input port of the first selector 210. In the first selector 210, the second input port is selected in accordance with the determination of Step S51 described above. Therefore, the replacement processing unit 20 replaces the read data input to the first input port of the first selector 210 with the first instruction 220 input to the second input port, and passes the first instruction 220 to the processor 10 as replacement data. The fact that data fetched from the reset vector matches the identification information 300 indicates that the program data 310 of a program to be executed by the processor 10 is written in the nonvolatile memory 30. Therefore, the processor 10 can execute the program based on the program data 310 by advancing the program counter in the processor 10 based on the first instruction 220.

In contrast, when determining that the value of the read data does not match the identification information 300 in Step S52 (Step S52, "No"), the replacement processing unit 20 shifts the processing to Step S54.

In Step S54, the replacement processing unit 20 selects the second input port of the second selector 211 under the control in accordance with the determination result from the code determination unit 201, outputs the second instruction 221 from the second selector 211, and inputs the second instruction 221 to the second input port of the first selector 210. In the first selector 210, the second input port is selected in accordance with the determination of Step S51 described above. Therefore, the replacement processing unit 20 replaces the read data input to the first input port of the first selector 210 with the second instruction 221 input to the second input port, and passes the second instruction 221 to the processor 10 as replacement data.

The fact that data fetched from the reset vector does not match the identification information 300 indicates that the program data of a program to be executed by the processor 10 is not written in the nonvolatile memory 30. Therefore, a runaway of the processor 10 due to an attempt to execute unwritten program data can be prevented by not advancing the program counter in the processor 10 based on the second instruction 221. In other words, the processor 10 can be prevented from performing an unexpected operation in accordance with an initial value of the nonvolatile memory 30 by not advancing the program counter in the processor 10 based on the second instruction 221.

In Step S51 above, when the access determination unit 200 determines that the access of the processor 10 to the nonvolatile memory 30 is not instruction fetch to the reset vector (Step S51, "No"), the replacement processing unit 20 shifts the processing to Step S55. Furthermore, the replacement processing unit 20 selects the first input port in the first selector 210 under the control of the access determination unit 200.

In Step S55, the replacement processing unit 20 passes the read data input to the first input port of the first selector 210 to the processor 10 as replacement data.

The fact that the access of the processor 10 to the nonvolatile memory 30 is not instruction fetch to the reset vector indicates that the program counter has been advanced from the reset vector based on the first instruction 220 in Step S53 above. Furthermore, in this case, as described above, the program data 310 is has been written in the nonvolatile memory 30. Thus, the read data read from the nonvolatile memory 30 is the program data 310. Therefore, the replacement processing unit 20 passes the read data read from the nonvolatile memory 30 to the processor 10 as it is.

As a result, the replacement processing unit 20 does not act on the access, other than the instruction fetch to the reset vector, of the processor 10 to the nonvolatile memory 30 at all. The processor 10 can execute the program based on normal program data.

FIG. 5 is a schematic diagram illustrating a description example in a Verilog-hardware description language (HDL) at the time when the replacement processing unit 20 according to the embodiment is implement on an AMBA high-speed bus (AHB). Note that "AMBA" is an abbreviation for an advanced microcontroller bus architecture, and is one of standards for an on-chip bus. Furthermore, in FIG. 5, the description is provided inside a frame. Each number at a left end outside the frame indicates a line number.

In FIG. 5, the 110th line is a register declaration related to access to the reset vector. In the 120th to 150th lines, an FF (flip-flop circuit) constituting the access determination unit 200 is described. The 130th line describes an initial state at the time of reset. In the 140th line, "HREADY" and "HTRANS" are control signals related to access. The value of "HREADY" of "true" and the value of "HTRANS" of "NONSEQ" indicate the presence of actual access. "HADDR" indicates an address. The value of "HREADY" of "true", the value of "HTRANS" of "NONSEQ", and the value of "HADDR" of a macro "RESET_VECTOR" indicating a reset vector indicates the presence of access of the processor 10 to the reset vector.

The 160th line and the 170th line collectively describe the first selector 210, the second selector 211, and the code determination unit 201, and the first instruction 220 and the second instruction 221. The 170th line is a description related to the first selector 210. In this example, the 170th line describes that the first selector 210 is controlled by a control signal from the access determination unit 200.

In the 170th line, "HRDATAin=='IDENTIFYING_CODE" indicates the code determination unit 201. A macro "INST_NOP" indicates the first instruction 220 to advance the program counter of the processor 10. The first instruction can be defined in accordance with an instruction set architecture (ISA) of the processor 10 and an address at which the program data 310 is arranged. Furthermore, a macro "INST_JUMP_REL0" indicates the second instruction 221 not to advance the program counter of the processor 10. This can also be defined in accordance with the ISA of the processor 10.

In the 170th line, it is described that one of the macro "INST_NOP" and an instruction to jump to the same address (macro "INST_JUMP_REL0") is selected in accordance with whether or not "HRDATAin" matches identification information (described as macro "IDENTIFYING_CODE" in figure).

2-2. Writing Processing According to Embodiment

Figure 6:
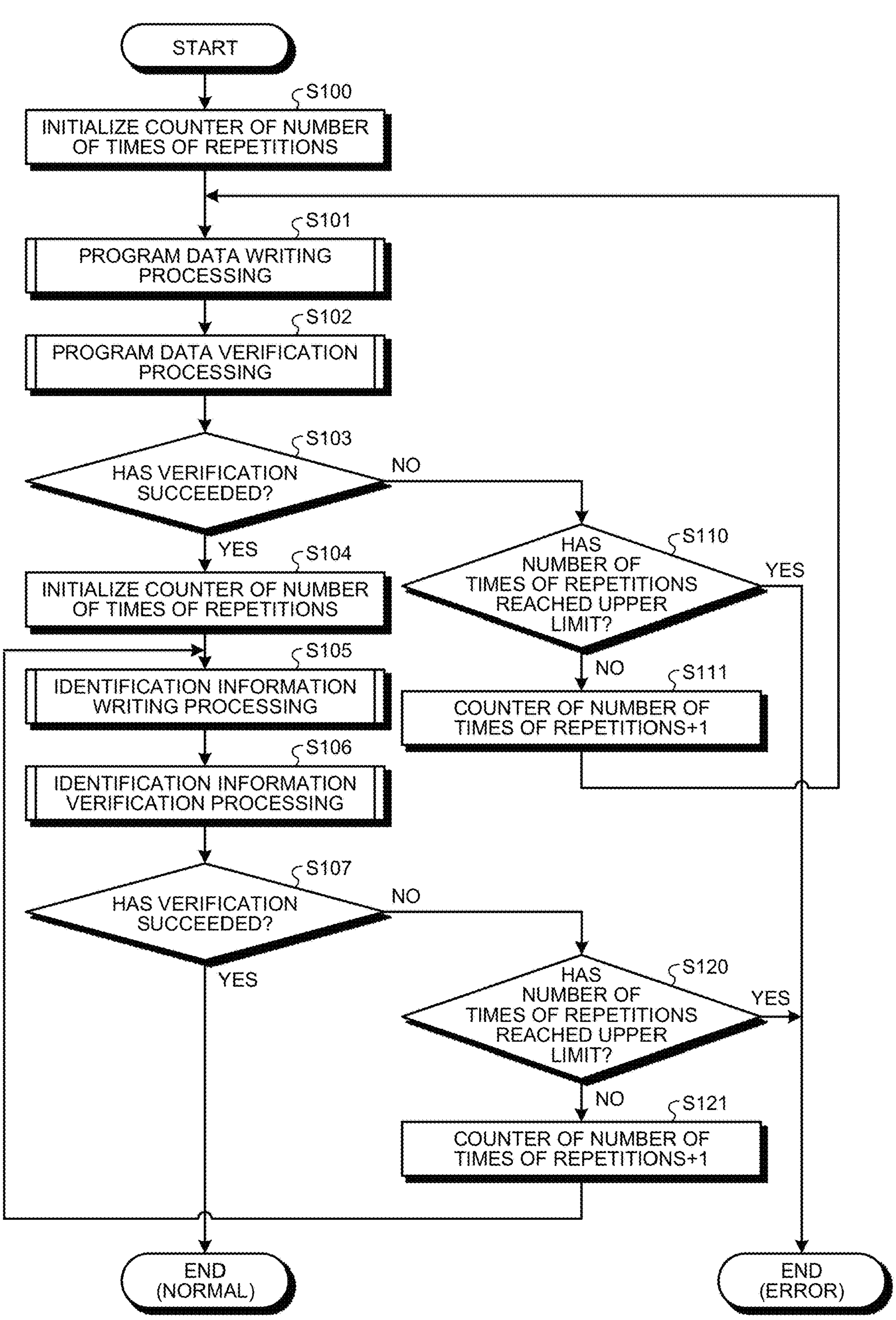
FIG. 6 is a flowchart illustrating one example of processing of writing to the nonvolatile memory according to the embodiment.

Next, processing of writing to the nonvolatile memory 30 according to the embodiment will be described. FIG. 6 is a flowchart illustrating one example of the processing of writing to the nonvolatile memory 30 according to the embodiment. The processing according to the flowchart of FIG. 6 is executed by using a writing device serving as a predetermined hardware device in accordance with the processing of Step S54 in the flowchart of FIG. 4 described above, for example.

For example, a predetermined information processing device may control the processor 10, and the processor 10 may execute the processing according to the flowchart of FIG. 6. In one example, a debugger is connected to the processor 10 as the predetermined information processing device. The debugger controls the processor 10 to cause the processor 10 to execute the processing according to the flowchart of FIG. 6. In this case, the processor 10 functions as a writing device that executes the processing according to the flowchart of FIG. 6.

This is not a limitation. The predetermined information processing device can be used as the writing device to cause the predetermined information processing device to execute the processing according to the flowchart of FIG. 6 instead of the processor 10.

In FIG. 6, in Step S100, the writing device initializes a counter of the number of times of repetitions. In next Step S101, the writing device executes processing of writing to the address $ADD_{prg}$ in the nonvolatile memory 30 of the program data 310. When ending the writing to the nonvolatile memory 30 of the program data 310, the writing device executes processing of verification to the written program data 310 in next Step S102.

In next Step S103, the writing device determines whether or not the verification processing in Step S102 has succeeded. When determining that the verification processing has failed (Step S103, "No"), the writing device shifts the processing to Step S110. In Step S110, the writing device determines whether or not the number of times of repetitions has reached a predetermined upper limit. When determining that the number of times of repetitions has not reached the upper limit (Step S110, "No"), the writing device shifts the processing to Step S111, increments the counter of the number of times of repetitions by one, and returns the processing to Step S101.

In contrast, when determining that the number of times of repetitions has reached the upper limit in Step S110 (Step S110, "Yes"), the writing device determines a writing error, and ends the series of processing in the flowchart of FIG. 6.

When determining that the verification processing has succeeded in Step S103 above (Step S103, "Yes"), the writing device shifts the processing to Step S104.

In Step S104, the writing device initializes the counter of the number of times of repetitions. In next Step S105, the writing device executes processing of writing to the address $ADD_{RV}$ (reset vector) in the nonvolatile memory 30 of the identification information 300. When ending the writing to the nonvolatile memory 30 of the identification information 300, the writing device executes processing of verification to the written identification information 300 in next Step S106.

In next Step S107, the writing device determines whether or not the verification processing in Step S106 has succeeded. When determining that the verification processing has failed (Step S107, "No"), the writing device shifts the processing to Step S120. In Step S120, the writing device determines whether or not the number of times of repetitions has reached a predetermined upper limit. Note that the upper limit of the number of times repetitions here may be the same as or different from the upper limit of the number of times of repetitions determined in Step S110 above. When determining that the number of repetitions has not reached the upper limit (Step S120, "No"), the writing device shifts the processing to Step S121, increments the counter of the number of times of repetitions by one, and returns the processing to Step S105.

In contrast, when determining that the number of times of repetitions has reached the upper limit in Step S120 (Step S120, "Yes"), the writing device determines a writing error, and ends the series of processing in the flowchart of FIG. 6.

As described above, the processing of writing to the nonvolatile memory 30 according to the embodiment includes at least: processing of writing the program data 310; verification processing of verifying whether or not the program data 310 is correctly written; processing of writing the identification information 300; and verification processing of verifying whether or not the identification information 300 is correctly written.

Here, in the writing processing according to the embodiment, as illustrated in the flowchart of FIG. 6, the processing of writing the identification information 300 is preferably performed after the processing of verification to the program data 310 succeeds. Correct identification information 300 is not written in a device in which the program data 310 has not been correctly written by performing writing to the nonvolatile memory 30 in this order, which can prevent the processor 10 from executing a program based on the program data 310 that is not correctly written.

As described above, according to the embodiment of the present disclosure, processing of causing the processor 10 to execute the program data 310 written in the nonvolatile memory 30 in a case where writing is performed in the nonvolatile memory 30 and executing writing to the nonvolatile memory 30 while preventing runaway of the processor 10 in a case where writing is not performed in the nonvolatile memory 30 can be performed at low costs.

That is, in the embodiment, the above-described determination and writing control can be performed without additional high-cost resources for switching an operation mode of a system to a special mode for storing the program data 310 in the nonvolatile memory 30 after the nonvolatile memory 30 is mounted on a circuit board, for example, an external terminal, a ROM, and an additional hardware sequencer for reading identification information from the nonvolatile memory 30.

Note that, for example, in a mass production process, the nonvolatile memory 30 is mounted on a circuit board before written. Therefore, the processing according to the flowchart of FIG. 6 may be automatically started after waiting for a certain period of time after reset release of the processor 10 on the premise that the processing certainly transitions to the processing of Step S54 in the flowchart of FIG. 4. Furthermore, there may be a case where writing to the nonvolatile memory 30 has not performed and a person needs to know that transition to processing of Step S54 in the flowchart of FIG. 4 has been performed. In this case, it is conceivable to start the processing according to the flowchart of FIG. 6 by "not exhibiting an expected behavior in a case where the processor 10 executes a program based on the program data 310 stored in the nonvolatile memory 30". In any example, the processing according to the flowchart of FIG. 6 can be started without having additional high-cost resources.

3. VARIATIONS OF EMBODIMENT

Next, variations of the embodiment will be described.

3-1. First Variation of Embodiment

Figure 7:
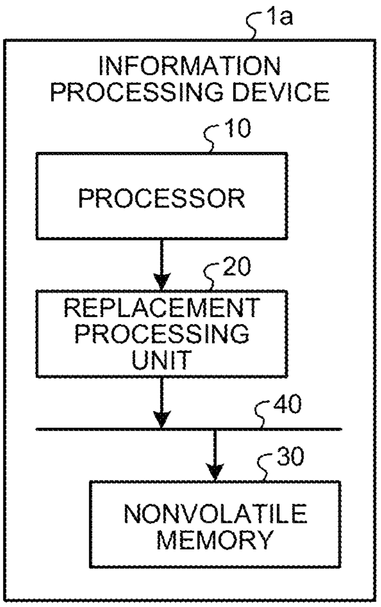
FIG. 7 is a block diagram schematically illustrating a configuration of one example of an information processing device according to a first variation of the embodiment.

First, a first variation of the embodiment will be described. FIG. 7 is a block diagram schematically illustrating a configuration of one example of an information processing device 1*a* according to the first variation of the embodiment.

In FIG. 7, the information processing device 1*a* includes the processor 10, the replacement processing unit 20 serving as a replacement device, and the nonvolatile memory 30. In the first variation of the embodiment, the processor 10 and the replacement processing unit 20 are directly connected, and the replacement processing unit 20 and the nonvolatile memory 30 are connected via the bus 40. Since processing in the replacement processing unit 20 and processing of writing to the nonvolatile memory 30 are similar to those in the above-described embodiment, the description thereof will be omitted here.

3-2. Second Variation of Embodiment

Figure 8:
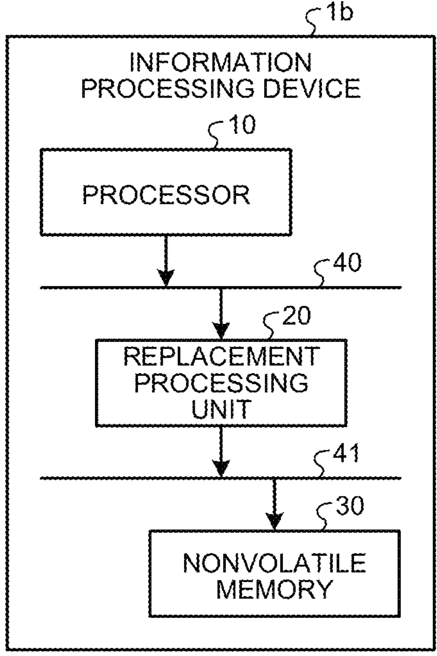
FIG. 8 is a block diagram schematically illustrating a configuration of one example of an information processing device according to a second variation of the embodiment.

Next, a second variation of the embodiment will be described. FIG. 8 is a block diagram schematically illustrating a configuration of one example of an information processing device 1*b* according to the second variation of the embodiment.

In FIG. 8, the information processing device 1*b* includes the processor 10, the replacement processing unit 20 serving as a replacement device, and the nonvolatile memory 30. In the second variation of the embodiment, the processor 10 and the replacement processing unit 20 are connected via the bus 40, and the replacement processing unit 20 and the nonvolatile memory 30 are connected via a bus 41. Since processing in the replacement processing unit 20 and processing of writing to the nonvolatile memory 30 are similar to those in the above-described embodiment, the description thereof will be omitted here.

Note that, in the configurations in FIGS. 1, 7, and 8, the processor 10, the replacement processing unit 20, and the nonvolatile memory 30 are assumed to be arranged on the same semiconductor chip. Note that the semiconductor chip is obtained by cutting a semiconductor wafer constituting a circuit.

3-3. Third Variation of Embodiment

Figure 9:
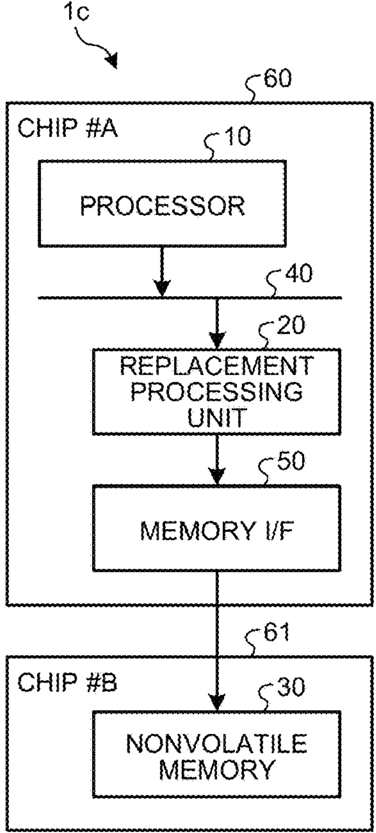
FIG. 9 is a block diagram schematically illustrating a configuration of one example of an information processing device according to a third variation of the embodiment.

Next, a third variation of the embodiment will be described. FIG. 9 is a block diagram schematically illustrating a configuration of one example of an information processing device 1*c* according to the third variation of the embodiment.

In the third variation of the embodiment, as illustrated in FIG. 9, the information processing device 1*c* includes a plurality of chips 60 and 61 (respectively illustrated as chip #A and chip #B in figure). The chip 60 includes the processor 10, the replacement processing unit 20, and a memory interface (I/F) 50. Furthermore, the chip 61 includes the nonvolatile memory 30. The chips 60 and 61 are provided in a single package or on the same circuit board, for example.

Note that the package refers to an object obtained by connecting a terminal with one or more semiconductor chips to seal the semiconductor chips. Furthermore, a semiconductor product in a package state is mounted on the circuit board. A semiconductor chip may be directly mounted on the circuit board.

In the chip 60, the processor 10 is connected to the replacement processing unit 20 via the bus 40. The replacement processing unit 20 is connected to the nonvolatile memory 30 provided in the chip 61 via the memory I/F 50. Since processing in the replacement processing unit 20 and processing of writing to the nonvolatile memory 30 are similar to those in the above-described embodiment, the description thereof will be omitted here.

As described above, the technique of the present disclosure can be similarly applied also to the information processing device 1*c* including the plurality of chips 60 and 61. Furthermore, the configuration in FIG. 9 is not a limitation. Which of a plurality of chips the processor 10, the replacement processing unit 20, and the nonvolatile memory 30 are arranged in is optionally determined.

3-4. Fourth Variation of Embodiment

Next, a fourth variation of the embodiment will be described. In the fourth variation of the embodiment, the information processing device 1 includes a plurality of replacement processing units 20.

Figure 10:
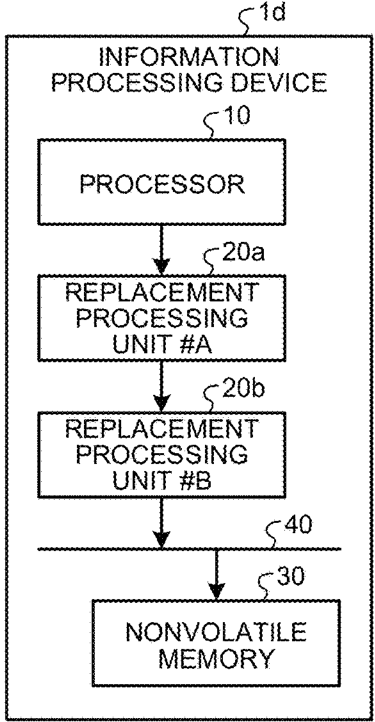
FIG. 10 is a block diagram schematically illustrating a configuration of one example of an information processing device according to a fourth variation of the embodiment.

FIG. 10 is a block diagram schematically illustrating a configuration of one example of an information processing device 1*d* according to the fourth variation of the embodiment. In FIG. 10, the information processing device 1*d* includes the processor 10, replacement processing units 20*a* and 20*b*, and the nonvolatile memory 30. The processor 10 is connected to the nonvolatile memory 30 via the replacement processing units 20*a* and 20*b* and the bus 40. Furthermore, the replacement processing units 20*a* and 20*b* are connected in series with respect to read data read from the nonvolatile memory 30. Note that, in the figure, the replacement processing units 20*a* and 20*b* are also illustrated as a replacement processing unit #A and a replacement processing unit #B, respectively.

In the configuration of FIG. 10, the replacement processing units 20*a* and 20*b* determine access of the processor 10 based on identification information written in different addresses of the nonvolatile memory 30.

Figure 11:
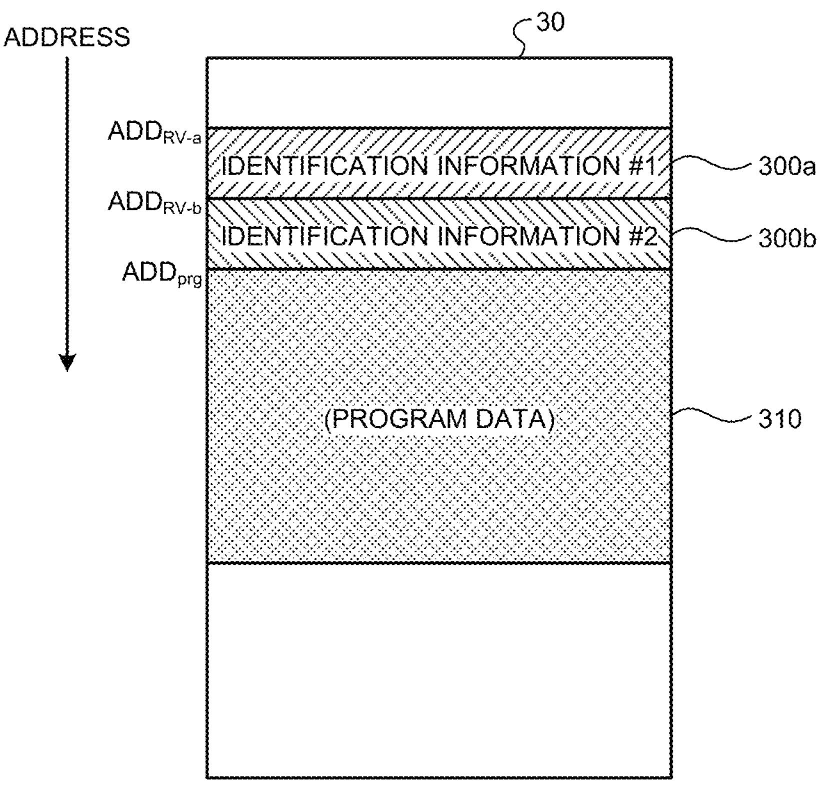
FIG. 11 is a schematic diagram illustrating a configuration of one example of the nonvolatile memory applicable to the fourth variation of the embodiment.

FIG. 11 is a schematic diagram illustrating a configuration of one example of the nonvolatile memory 30 applicable to the fourth variation of the embodiment. Note that FIG. 11 illustrates an example of a state in which each piece of data is written in the nonvolatile memory 30.

In the nonvolatile memory 30 in which data has been written, identification information 300*a* (first identification information, also referred to as identification information #1 in figure) is placed at a predetermined address $ADD_{RV\text{-}a}$ (first predetermined address). Identification information 300*b* (second identification information, also referred to as identification information #2 in figure) is placed at a predetermined address $ADD_{RV\text{-}b}$ (second predetermined address) different from the address $ADD_{RV\text{-}a}$. The program data 310 of a program executed by the processor 10 at the time of boot is stored at an address $ADD_{prg}$.

The pieces of identification information 300*a* and 300*b* respectively placed at the addresses $ADD_{RV\text{-}a}$ and $ADD_{RV\text{-}b}$ correspond to the above-described identification information 300, and are special words for identifying whether or not writing has been performed in the nonvolatile memory 30. The pieces of identification information 300*a* and 300*b* may be different words or the same word.

Similarly to the above-described identification information 300, for example, when there is a value that the nonvolatile memory 30 can easily take as an initial value, values other than the value are set as the pieces of identification information 300*a* and 300*b*. When the initial value of the nonvolatile memory 30 is randomly determined, it is conceivable to use randomly determined values as the pieces of identification information 300*a* and 300*b*. Furthermore, each of the pieces of identification information 300*a* and 300*b* preferably has the number of bits (e.g., 16 bits and 32 bits) in accordance with the bus width of the bus 40, for example.

For example, the address ADDRV-a among the addresses ADDRV-a and ADDRV-b is an address at which the processor 10 booted from the nonvolatile memory 30 first performs instruction fetch after reset release, and is also referred to as a reset vector. This is not a limitation. The address ADDRV-b may be set as the reset vector. In the following description, the address ADDRV-a is assumed as the reset vector.

Note that, although, in FIG. 11, the pieces of identification information 300*a* and 300*b* are arranged at adjacent addresses on the nonvolatile memory 30, this example is not a limitation. That is, the address $ADD_{RV\text{-}a}$ at which the identification information 300*a* is arranged and the address $ADD_{RV\text{-}b}$ at which the identification information 300*b* is arranged may be discontinuous.

Since the address $ADD_{prg}$ at which the program data 310 is placed is similar to the address $ADD_{prg}$ in the embodiment described with reference to FIG. 2, the description thereof is omitted here.

FIG. 12 is a block diagram illustrating a configuration of one example of the replacement processing units 20*a* and 20*b* according to the fourth variation of the embodiment. The replacement processing units 20*a* and 20*b* have equivalent configurations. That is, the replacement processing unit 20*a* includes an access determination unit 200*a*, a code determination unit 201*a*, a first selector 210*a*, and a second selector 211*a*. Furthermore, the replacement processing unit 20*b* includes an access determination unit 200*b*, a code determination unit 201*b*, a first selector 210*b*, and a second selector 211*b*.

In FIG. 12, for example, the replacement processing unit 20*a* may act at the time of instruction fetch to the reset vector (address ADDRV-a in this example). The replacement processing unit 20*b* may act on instruction fetch to an address (second predetermined address, in this example, address ADDRV-b) of the next instruction fetch generated by the processor 10 executing a first instruction 220*a* from the replacement processing unit 20*a*.

The operations of the replacement processing units 20*a* and 20*b* will be described more specifically.

The access determination unit 200*b* acquires address information and a control signal. Read data read from the nonvolatile memory 30 is input to the code determination unit 201*b* and a first input port (No side) of the first selector 210*b*. Output of the second selector 211*b* is input to a second input port (Yes side) of the first selector 210*b*. In the first selector 210*b*, one of the first input port and the second input port is selected in accordance with the determination result from the access determination unit 200*b*. A first instruction 220*b* is input to a first input port of the second selector 211*b*, and a second instruction 221*b* is input to a second input port. In the second selector 211*b*, one of the first input port and the second input port is selected in accordance with the determination result from the code determination unit 201*b*.

The second instruction 221*b* may be an instruction not to change the program counter of the processor 10. More specifically, an instruction to jump to the same address as the current one of the nonvolatile memory 30, that is, an instruction to jump to the address of the identification information 300*b* may be applied as the second instruction 221*b*. In response to the jump instruction, the processor 10 executes a jump to the same address as the current one. At this time, the processor 10 does not change the program counter.

The access determination unit 200*a* acquires address information and a control signal. Output of the first selector 210*b* of the replacement processing unit 20*b* is input to the code determination unit 201*a* and a first input port of the first selector 210*a*. Output of the second selector 211*a* is input to a second input port of the first selector 210*a*. In the first selector 210*a*, one of the first input port and the second input port is selected in accordance with the determination result from the access determination unit 200*a*. A first instruction 220*a* is input to a first input port of the second selector 211*a*, and a second instruction 221*a* is input to a second input port. In the second selector 211*a*, one of the first input port and the second input port is selected in accordance with the determination result from the code determination unit 201*a*.

For example, the access determination unit 200*a* may determine whether or not access in accordance with the acquired address information is provided to the reset vector (address ADDRV-a in this example). Furthermore, the access determination unit 200*b* may determine whether or not the access in accordance with the acquired address information is provided to an address (address ADDRV-b in this example) of the next instruction fetch generated by the processor 10 executing the first instruction 220*a*. In this case, the identification information 300*a* (first identification information) is written to the reset vector, and the identification information 300*b* (second identification information) is written to the address of the next instruction fetch generated by the processor 10 executing the first instruction 220*a*.

In such a configuration, the identification information 300*a* is written to the reset vector of the nonvolatile memory 30, and the identification information 300*b* is written to an address of the next instruction fetch generated by the processor 10 executing the first instruction 220*a* fetched by access to the reset vector.

In this case, in the replacement processing unit 20*b*, the access determination unit 200*b* selects the first input port (No side) of the first selector 210*b* for access of the processor 10 to the reset vector (address $ADD_{RV-a}$ in this example). This causes the identification information 300*a* read from the reset vector of the nonvolatile memory 30 to be passed to the replacement processing unit 20*a* via the first selector 210*b* and input to the code determination unit 201*a* and the first input port (No side) of the first selector 210*a*.

In contrast, in the replacement processing unit 20*a*, the access determination unit 200*a* selects the second input port (Yes side) of the first selector 210*a*. Furthermore, in the second selector 211*a*, the first input port (Yes side) is selected in accordance with the identification information 300*a* input from the replacement processing unit 20*b*. Thus, for example, the first instruction 220*a* is passed to the processor 10. The first instruction 220*a* is, for example, a NOP instruction for executing only an operation of incrementing a program counter with no operation.

In response to the passed first instruction 220*a*, the processor 10 accesses an address (address ADDRV-b in this example) of the next instruction fetch generated by the processor 10 executing the first instruction 220*a* of the nonvolatile memory 30, and reads the identification information 300*b*.

In response to the access of the processor 10 to the address ADDRV-b of the identification information 300*b*, in the replacement processing unit 20*b*, the access determination unit 200*b* selects the second input port (Yes side) of the first selector 210*b*. Furthermore, in response to the identification information 300*b* serving as read data from the nonvolatile memory 30, the code determination unit 201*b* selects the first input port (Yes side) of the second selector 211*b*. This causes the first instruction 220*b* serving as, for example, a NOP instruction to be passed to the replacement processing unit 20*a* via the second selector 211*b* and the first selector 210*b*.

In the replacement processing unit 20*a*, the access determination unit 200*a* selects the first input port (No side) of the first selector 210*a*. Thus, the first instruction 220*b* passed from the replacement processing unit 20*b* is passed to the processor 10.

In response to the passed first instruction 220*b*, the processor 10 accesses an address (e.g., address ADDprg) of the next instruction fetch generated by the processor 10 executing the first instruction 220*b* of the nonvolatile memory 30, and reads, for example, the program data 310.

In response to the access of the processor 10 to the program data 310, first input ports (No side) are selected in the first selector 210*a* of the replacement processing unit 20*a* and the first selector 210*b* of the replacement processing unit 20*b*. This causes the program data 310 read from the nonvolatile memory 30 to be passed to the processor 10.

Note that the address of the next instruction fetch generated by the processor 10 executing the first instruction 220*a* is different from the address of the reset vector. Furthermore, the address of the next instruction fetch generated by the processor 10 executing the first instruction 220*b* is different from the address ADDRV-a of the reset vector and the address ADDRV-b at which the identification information 300*b* is placed.

As described above, in the fourth variation of the embodiment, in addition to the replacement processing unit 20*a* that acts when the reset vector is fetched, another replacement processing unit 20*b* is added. The replacement processing unit 20*b* acts on an address fetched in accordance with a result obtained by executing the first instruction 220*a* returned by the replacement processing unit 20*a*. This makes it possible to have a plurality of pieces of identification information 300 (pieces of identification information 300*a* and 300*b*), and to reduce the probability that an initial value of the nonvolatile memory 30 in which writing has not been performed accidentally matches the identification information 300.

Note that the effects described in the present specification are merely examples and not limitations. Other effects may be obtained.

Note that the present technology can also have the configurations as follows.

(1) A replacement device comprising:

a first determination unit that determines whether or not a processor has performed access of instruction fetch to a predetermined address of a nonvolatile memory on the nonvolatile memory used by the processor as a boot device;

a second determination unit that determines whether or not data acquired by the access of the instruction fetch from the nonvolatile memory matches identification information indicating that program data has been written in the nonvolatile memory when the first determination unit determines that the access of the instruction fetch to the predetermined address has been performed; and a replacement unit that replaces the data with one of a first instruction to change a program counter in the processor and a second instruction not to change the program counter in accordance with a determination result from the second determination unit, and outputs one of the first instruction and the second instruction to the processor.

(2) The replacement device according to the above (1), wherein the replacement unit replaces the data with the first instruction when the second determination unit determines that the data matches the identification information, and replaces the data with the second instruction when the second determination unit determines that the data does not match the identification information.

(3) The replacement device according to the above (1) or (2), further comprising a selection unit that selects which one of the data and the first instruction or the second instruction is to be output to the processor in accordance with a determination result from the first determination unit.

(4) The replacement device according to any one of the above (1) to (3), wherein the first instruction is a no operation (NOP) instruction.

(5) The replacement device according to any one of the above (1) to (3), wherein the first instruction is a jump instruction instructing a jump to an address different from an address at which the identification information is placed in the nonvolatile memory.

(6) The replacement device according to any one of the above (1) to (5), wherein the second instruction is a jump instruction instructing a jump to an address at which the identification information is placed in the nonvolatile memory.

(7) The replacement device according to any one of the above (1) to (6), wherein the predetermined address is used for the processor to access the nonvolatile memory for first performing instruction fetch after reset release.

(8) An information processing method comprising:

a first determination step of determining whether or not a processor has performed access of instruction fetch to a predetermined address of a nonvolatile memory on the nonvolatile memory used by the processor as a boot device;

a second determination step of determining whether or not data acquired by the access of the instruction fetch from the nonvolatile memory matches identification information indicating that program data has been written in the nonvolatile memory when it is determined, in the first determination step, that the access of the instruction fetch to the predetermined address has been performed; and a replacement step of replacing the data with one of a first instruction to change a program counter in the processor and a second instruction not to change the program counter in accordance with a determination result of the second determination step, and outputs one of the first instruction and the second instruction to the processor.

(9) An information processing method comprising:

a first writing step of writing program data to an address of a nonvolatile memory, the address not overlapping a predetermined address for a processor using the nonvolatile memory as a boot device to access the nonvolatile memory for first performing instruction fetch after reset release; and a second writing step of writing identification information indicating that the program data has been written in the nonvolatile memory to the predetermined address of the nonvolatile memory after the program data is written in the first writing step, a hardware device executing the first writing step and the second writing step.

(10) The information processing method according to the above (9), wherein the first writing step includes:

first writing processing of writing the program data to the nonvolatile memory; and first verification processing for the first writing processing, wherein processing shifts to the second writing step when the first verification processing succeeds, the first writing processing is re-executed when the first verification processing fails, the second writing step is skipped when re-execution of the first writing processing is repeated up to a number of times of an upper limit, and processing of writing to the nonvolatile memory is ended with an error.

(11) The information processing method according to the above (9) or (10), wherein the second writing step includes:

second writing processing of writing the identification information to the nonvolatile memory; and second verification processing for the second writing processing, wherein processing of writing to the nonvolatile memory is normally ended when the second verification processing succeeds, the second writing processing is re-executed when the second verification processing fails, and the processing of writing to the nonvolatile memory is ended with an error when re-execution of the second writing processing is repeated up to a number of times of an upper limit.

(12) An information processing device comprising:

a processor; and a nonvolatile memory used by the processor as a boot device, wherein, in the nonvolatile memory, writing of first identification information indicating that a program data to be executed by the processor has been written in the nonvolatile memory to a first predetermined address which the processor first performs instruction fetch after reset release and writing of the program data to an address not overlapping the first predetermined address are executed after the nonvolatile memory is mounted.

(13) The information processing device according to the above (12), further comprising a first replacement processing unit including:

a first determination unit that determines whether or not the processor has performed access of instruction fetch to the first predetermined address of the nonvolatile memory on the nonvolatile memory;

a second determination unit that determines whether or not data acquired by the access of the instruction fetch from the nonvolatile memory matches the first identification information when the first determination unit determines that the access of the instruction fetch to the first predetermined address has been performed; and a first replacement unit that replaces the data with one of a first instruction to change a program counter in the processor and a second instruction not to change the program counter in accordance with a determination result from the second determination unit, and outputs one of the first instruction and the second instruction to the processor.

(14) The information processing device according to the above (13), wherein the first replacement unit replaces the data with the first instruction when the second determination unit determines that the data matches the first identification information, and replaces the data with the second instruction when the second determination unit determines that the data does not match the first identification information.

(15) The information processing device according to the above (13) or (14), further comprising a first selection unit that selects which one of the data and the first instruction or the second instruction is to be output to the processor in accordance with a determination result from the first determination unit.

(16) The information processing device according to any one of the above (13) to (15), wherein the first instruction is a no operation (NOP) instruction.

(17) The information processing device according to any one of the above (13) to (15), wherein the first instruction is a jump instruction instructing a jump to an address different from an address at which the first identification information is placed in the nonvolatile memory.

(18) The information processing device according to any one of the above (13) to (17), wherein the second instruction is a jump instruction instructing a jump to an address at which the first identification information is placed in the nonvolatile memory.

(19) The information processing device according to any one of the above (13) to (18), further comprising a second replacement processing unit including:

a third determination unit that determines whether or not the processor has performed access of instruction fetch to a second predetermined address different from the first predetermined address of the nonvolatile memory on the nonvolatile memory;

a fourth determination unit that determines whether or not data acquired by the access of the instruction fetch from the nonvolatile memory matches the a second identification information when the third determination unit determines that the access of the instruction fetch to the second predetermined address has been performed; and a second replacement unit that replaces the data with one of a third instruction to change a program counter in the processor and a fourth instruction not to change the program counter in accordance with a determination result from the fourth determination unit, and outputs one of the third instruction and the fourth instruction to the processor, wherein each of the first replacement processing unit and the second replacement processing unit acquires information indicating the access of the instruction fetch, and output of the second replacement unit is input to the first replacement unit.

(20) The information processing device according to the above (19), wherein the third instruction is a no operation (NOP) instruction.

(21) The information processing device according to the above (19), wherein the third instruction is a jump instruction instructing a jump to an address different from an address at which the first identification information and the second identification information are placed in the nonvolatile memory.

(22) The information processing device according to any one of the above (19) to (21), wherein the fourth instruction is a jump instruction instructing a jump to an address at which the second identification information is placed in the nonvolatile memory.

REFERENCE SIGNS LIST

1, 1*a*, 1*b*, 1*c*, 1*d* INFORMATION PROCESSING DEVICE
10 PROCESSOR
20, 20*a*, 20*b* REPLACEMENT PROCESSING UNIT
30 NONVOLATILE MEMORY
40, 41 BUS
50 MEMORY I/F
60, 61 CHIP
200, 200*a*, 200*b* ACCESS DETERMINATION UNIT
201, 201*a*, 201*b* CODE DETERMINATION UNIT
210, 210*a*, 210*b* FIRST SELECTOR
211, 211*a*, 211*b* SECOND SELECTOR
220, 220*a*, 220*b* FIRST INSTRUCTION
221, 221*a*, 221*b* SECOND INSTRUCTION
300, 300*a*, 300*b* IDENTIFICATION INFORMATION
310 PROGRAM DATA

The invention claimed is:

1. A replacement device comprising:

a first determination unit that determines whether or not a processor has performed access of instruction fetch to a predetermined address of a nonvolatile memory on the nonvolatile memory used by the processor as a boot device;

a second determination unit that determines whether or not data acquired by the access of the instruction fetch from the nonvolatile memory matches identification information indicating that program data has been written in the nonvolatile memory when the first determination unit determines that the access of the instruction fetch to the predetermined address has been performed; and a replacement unit that replaces the data with one of a first instruction to change a program counter in the processor and a second instruction not to change the program counter in accordance with a determination result from the second determination unit, and outputs one of the first instruction and the second instruction to the processor.

2. The replacement device according to claim 1, wherein the replacement unit replaces the data with the first instruction when the second determination unit determines that the data matches the identification information, and replaces the data with the second instruction when the second determination unit determines that the data does not match the identification information.

3. The replacement device according to claim 1, further comprising a selection unit that selects which one of the data and the first instruction or the second instruction is to be output to the processor in accordance with a determination result from the first determination unit.

4. The replacement device according to claim 1, wherein the first instruction is a no operation (NOP) instruction.

5. The replacement device according to claim 1, wherein the first instruction is a jump instruction instructing a jump to an address different from an address at which the identification information is placed in the nonvolatile memory.

6. The replacement device according to claim 1, wherein the second instruction is a jump instruction instructing a jump to an address at which the identification information is placed in the nonvolatile memory.

7. The replacement device according to claim 1, wherein the predetermined address is used for the processor to access the nonvolatile memory for first performing instruction fetch after reset release.

8. An information processing method comprising:

a first determination step of determining whether or not a processor has performed access of instruction fetch to a predetermined address of a nonvolatile memory on the nonvolatile memory used by the processor as a boot device;

a second determination step of determining whether or not data acquired by the access of the instruction fetch from the nonvolatile memory matches identification information indicating that program data has been written in the nonvolatile memory when it is determined, in the first determination step, that the access of the instruction fetch to the predetermined address has been performed; and a replacement step of replacing the data with one of a first instruction to change a program counter in the processor and a second instruction not to change the program counter in accordance with a determination result of the second determination step, and outputs one of the first instruction and the second instruction to the processor.

9. An information processing method comprising:

a first writing step of writing program data to an address of a nonvolatile memory, the address not overlapping a predetermined address for a processor using the nonvolatile memory as a boot device to access the nonvolatile memory for first performing instruction fetch after reset release; and a second writing step of writing identification information indicating that the program data has been written in the nonvolatile memory to the predetermined address of the nonvolatile memory after the program data is written in the first writing step, a hardware device executing the first writing step and the second writing step;

wherein the first writing step includes:

first writing processing of writing the program data to the nonvolatile memory; and first verification processing for the first writing processing, wherein processing shifts to the second writing step when the first verification processing succeeds, the first writing processing is re-executed when the first verification processing fails, the second writing step is skipped when re-execution of the first writing processing is repeated up to a number of times of an upper limit, and processing of writing to the nonvolatile memory is ended with an error.

10. The information processing method according to claim 9, wherein the second writing step includes:

second writing processing of writing the identification information to the nonvolatile memory; and second verification processing for the second writing processing, wherein processing of writing to the nonvolatile memory is normally ended when the second verification processing succeeds, the second writing processing is re-executed when the second verification processing fails, and the processing of writing to the nonvolatile memory is ended with an error when re-execution of the second writing processing is repeated up to a number of times of an upper limit.

11. An information processing device comprising:

a processor; and a nonvolatile memory used by the processor as a boot device, wherein, in the nonvolatile memory, writing of first identification information indicating that a program data to be executed by the processor has been written in the nonvolatile memory to a first predetermined address which the processor first performs instruction fetch after reset release and writing of the program data to an address not overlapping the first predetermined address are executed after the nonvolatile memory is mounted;

wherein the information processing device further comprising a first replacement processing unit including:

a first determination unit that determines whether or not the processor has performed access of instruction fetch to the first predetermined address of the nonvolatile memory on the nonvolatile memory;

a second determination unit that determines whether or not data acquired by the access of the instruction fetch from the nonvolatile memory matches the first identification information when the first determination unit determines that the access of the instruction fetch to the first predetermined address has been performed; and a first replacement unit that replaces the data with one of a first instruction to change a program counter in the processor and a second instruction not to change the program counter in accordance with a determination result from the second determination unit, and outputs one of the first instruction and the second instruction to the processor.

12. The information processing device according to claim 11, wherein the first replacement unit replaces the data with the first instruction when the second determination unit determines that the data matches the first identification information, and replaces the data with the second instruction when the second determination unit determines that the data does not match the first identification information.

13. The information processing device according to claim 11, further comprising a first selection unit that selects which one of the data and the first instruction or the second instruction is to be output to the processor in accordance with a determination result from the first determination unit.

14. The information processing device according to claim 11, wherein the first instruction is a no operation (NOP) instruction.

15. The information processing device according to claim 11, wherein the first instruction is a jump instruction instructing a jump to an address different from an address at which the first identification information is placed in the nonvolatile memory.

16. The information processing device according to claim 11, wherein the second instruction is a jump instruction instructing a jump to an address at which the first identification information is placed in the nonvolatile memory.

17. The information processing device according to claim 11, further comprising a second replacement processing unit including:

a third determination unit that determines whether or not the processor has performed access of instruction fetch to a second predetermined address different from the first predetermined address of the nonvolatile memory on the nonvolatile memory;

a fourth determination unit that determines whether or not data acquired by the access of the instruction fetch from the nonvolatile memory matches a second identification information when the third determination unit determines that the access of the instruction fetch to the second predetermined address has been performed; and a second replacement unit that replaces the data with one of a third instruction to change a program counter in the processor and a fourth instruction not to change the program counter in accordance with a determination result from the fourth determination unit, and outputs one of the third instruction and the fourth instruction to the processor, wherein each of the first replacement processing unit and the second replacement processing unit acquires information indicating the access of the instruction fetch, and output of the second replacement unit is input to the first replacement unit.

18. The information processing device according to claim 17, wherein the third instruction is a no operation (NOP) instruction.

19. The information processing device according to claim 17, wherein the third instruction is a jump instruction instructing a jump to an address different from an address at which the first identification information and the second identification information are placed in the nonvolatile memory.

20. The information processing device according to claim 17, wherein the fourth instruction is a jump instruction instructing a jump to an address at which the second identification information is placed in the nonvolatile memory.

* * * * *